(12) United States Patent
Honda

(10) Patent No.: US 8,433,501 B2
(45) Date of Patent: Apr. 30, 2013

(54) INTERNAL COMBUSTION ENGINE FUEL INJECTION CONTROL METHOD

(75) Inventor: Tetsuya Honda, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 450 days.

(21) Appl. No.: 12/786,733

(22) Filed: May 25, 2010

(65) Prior Publication Data

US 2011/0118956 A1    May 19, 2011

(30) Foreign Application Priority Data

Nov. 19, 2009  (JP) ................................ 2009-263532

(51) Int. Cl.
F02D 41/30 (2006.01)

(52) U.S. Cl.
USPC .................... 701/105; 123/299; 123/90.15

(58) Field of Classification Search .................. 123/299,
123/300, 301, 345–348, 90.15, 435; 701/103–105
See application file for complete search history.

(56) References Cited

U.S. PATENT DOCUMENTS

| | | | | |
|---|---|---|---|---|
| 5,390,641 A | * | 2/1995 | Yamada et al. | 123/491 |
| 6,588,399 B2 | * | 7/2003 | Okamoto et al. | 123/305 |
| 6,666,186 B2 | * | 12/2003 | Laimbock | 123/302 |
| 7,013,875 B2 | * | 3/2006 | Saruwatari | 123/478 |
| 7,198,031 B2 | * | 4/2007 | Saito et al. | 123/431 |
| 7,716,919 B2 | * | 5/2010 | Murase et al. | 60/289 |
| 7,726,289 B2 | * | 6/2010 | Murase et al. | 123/685 |
| 7,950,369 B2 | * | 5/2011 | Morita et al. | 123/406.53 |

FOREIGN PATENT DOCUMENTS

| | | | |
|---|---|---|---|
| JP | 4-203246 | * | 7/1992 |
| JP | 08-028311 A | | 1/1996 |
| JP | 9-88646 | * | 3/1997 |
| JP | 11-270388 A | | 10/1999 |
| JP | 2003-239796 A | | 8/2003 |
| JP | 2004-084532 A | | 3/2004 |
| JP | 2006-144752 A | | 6/2006 |
| JP | 2007-224740 A | | 9/2007 |
| JP | 2010-048194 A | | 3/2010 |
| JP | 2010-203404 A | | 9/2010 |

* cited by examiner

Primary Examiner — Hai Huynh
(74) Attorney, Agent, or Firm — Sughrue Mion, PLLC

(57) ABSTRACT

In an internal combustion engine provided with a fuel injection valve for injecting fuel into an intake air flow path for each cylinder, there is performed a plurality of fuel injections during one cycle for each cylinder, one injection thereof being performed in synchronization with a period during which an intake valve is being opened and reverse flow of in-cylinder gas into the intake air flow path occurs. In accordance with a measurement quantity that changes as the temperatures of the surface, at the intake air flow path, of the intake valve and the inner wall face of the intake air flow path change, there is set the proportion of the amount of fuel injected in synchronization with the period during which reverse flow occurs to the total amount of fuel injected in one cycle for each cylinder.

5 Claims, 8 Drawing Sheets

INTERNAL COMBUSTION ENGINE FUEL INJECTION CONTROL METHOD

BACKGROUND OF THE INVENTION

1. Field of the Invention

The present invention relates to an internal combustion engine fuel injection control method of raising mainly low-temperature startability, gasoline mileage, and exhaust-gas cleanness of an internal combustion engine where fuel is injected into an intake air flow path.

2. Description of the Related Art

In an internal combustion engine utilizing a method of injecting fuel into an intake air flow path, deterioration in low-temperature startability, gasoline mileage, exhaust-gas cleanness, which is caused through adhesion of the injected fuel onto the wall face of the intake air flow path, is of a particular problem.

As prevention measures for fuel adhesion to the wall face of an intake air flow path, fuel injection directed to an intake valve is effective. However, in the case where that kind of fuel injection is performed in synchronization with intake-air inflow into a cylinder, unevaporated fuel particles directly flow into the cylinder; therefore, no fuel-air mixture suitable for combustion can be obtained by the time combustion starts, whereby deterioration in startability, gasoline mileage, and exhaust-gas cleanness is caused eventually.

In the case where that kind of fuel injection is performed before the intake valve is opened, almost all of the injected fuel once adheres to the surface of the intake valve. When the internal combustion engine is still cool, the intake valve opens with most of the fuel being adhered to the surface of the intake valve; thus, the fuel, as a mass of liquid, flows into the cylinder or it is returned into the intake air flow path due to the effect of in-cylinder gas that is blown back to the inside of the intake air flow path and then, as a relatively large droplet fuel, flows into the cylinder along with the intake air. As a result, no fuel-air mixture suitable for combustion can be obtained by the time the combustion starts, whereby deterioration in startability, gasoline mileage, and exhaust-gas cleanness is caused eventually.

Accordingly, to date, in Japanese Patent Application Laid-Open No. 2003-239796, for example, there has been disclosed a technology in which the intake valve is opened during the exhaust stroke and fuel injection is implemented in synchronization with the timing when the valve is opened, the in-cylinder gas that is blown back into the intake air flow path due to the opening of the intake valve is made to collide with the injected fuel so that while fuel adhesion to the wall face of the intake air flow path or the surface of the intake valve are prevented, the evaporation of the fuel and the mixture of the fuel and air are facilitated.

In the technology disclosed in Japanese Patent Application Laid-Open No. 2003-239796, in order to make all the amount of injected fuel collide with in-cylinder gas that reversely flows, more reverse flow is required. However, in the case of normal valve overlap setting, the intake valve starts to open immediately before the piston reaches the top dead center of the exhaust stroke; therefore, there can be obtained only a little amount of reverse flow. Accordingly, in the technology disclosed in Japanese Patent Application Laid-Open No. 2003-239796, the intake valve is temporarily opened at a time when the moving speed of the piston is high and the exhaustion of in-cylinder gas is active, so that reverse flow of in-cylinder gas to the intake air flow path, which is extremely strong compared with the normal condition, is obtained.

However, in the case where fuel is injected toward the extremely strong reverse flow produced in such a way as described above, part of the injected fuel is strongly pushed back by the reverse flow and adheres, for example, to the upstream wall face of the intake air flow path. Because the inflow of the fuel that has adhered, for example, to the upstream wall face of the intake air flow path is delayed, the amount of fuel that is injected in a cycle does not coincide with the amount of fuel that substantially flows into the cylinder; therefore, there still remains the problem of deterioration in startability, gasoline mileage, and exhaust-gas cleanness.

Moreover, the rate of inert gas included in the in-cylinder gas that is blown back differs depending on the result of previous-cycle combustion; thus, when a greater amount of reverse flow is produced, especially, at the starting timing when the combustion condition is unstable, the fluctuation of substantial air-fuel ratio of a fuel-air mixture produced inside the cylinder becomes large, whereby deterioration in startability and exhaust-gas cleanness becomes more conspicuous.

SUMMARY OF THE INVENTION

The present invention has been implemented in order to solve the foregoing problems; the objective thereof is to provide an internal combustion engine fuel injection control method in which, even through relatively weak in-cylinder gas reverse flow, produced in normal valve overlap, to the intake air flow path, fuel adhesion to the wall face of the intake air flow path is prevented and evaporation of the fuel and the mixture of the fuel and air are facilitated, so that, in particular, low-temperature startability, gasoline mileage, and exhaust-gas cleanness are raised.

According to an internal combustion engine fuel injection control method of the present invention, in an internal combustion engine provided with a fuel injection valve for injecting fuel into an intake air flow path for each cylinder, there is performed a plurality of fuel injections during one cycle for each cylinder, one injection thereof being performed in synchronization with a period during which an intake valve is being opened and reverse flow of in-cylinder gas into the intake air flow path occurs.

Moreover, in accordance with a measurement quantity that changes as the temperatures of the surface, at the intake air flow path, of the intake valve and the inner wall face of the intake air flow path change, there is set the proportion of the amount of fuel injected in synchronization with the period during which reverse flow of in-cylinder gas into the intake air flow path occurs to the total amount of fuel injected in one cycle for each cylinder.

An internal combustion engine fuel injection control method of the present invention makes it possible that evaporation of fuel and mixture of fuel and air in accordance with the operation state of an internal combustion engine are facilitated with a simple means that is not accompanied by any extra control for opening/closing of an intake valve; therefore, because excellent startability can always be obtained, there is demonstrated an effect that gasoline mileage and exhaust-gas cleanness can be improved.

The foregoing and other object, features, aspects, and advantages of the present invention will become more apparent from the following detailed description of the present invention when taken in conjunction with the accompanying drawings.

DETAILED DESCRIPTION OF THE PREFERRED EMBODIMENTS

Embodiment 1

Figure 1:
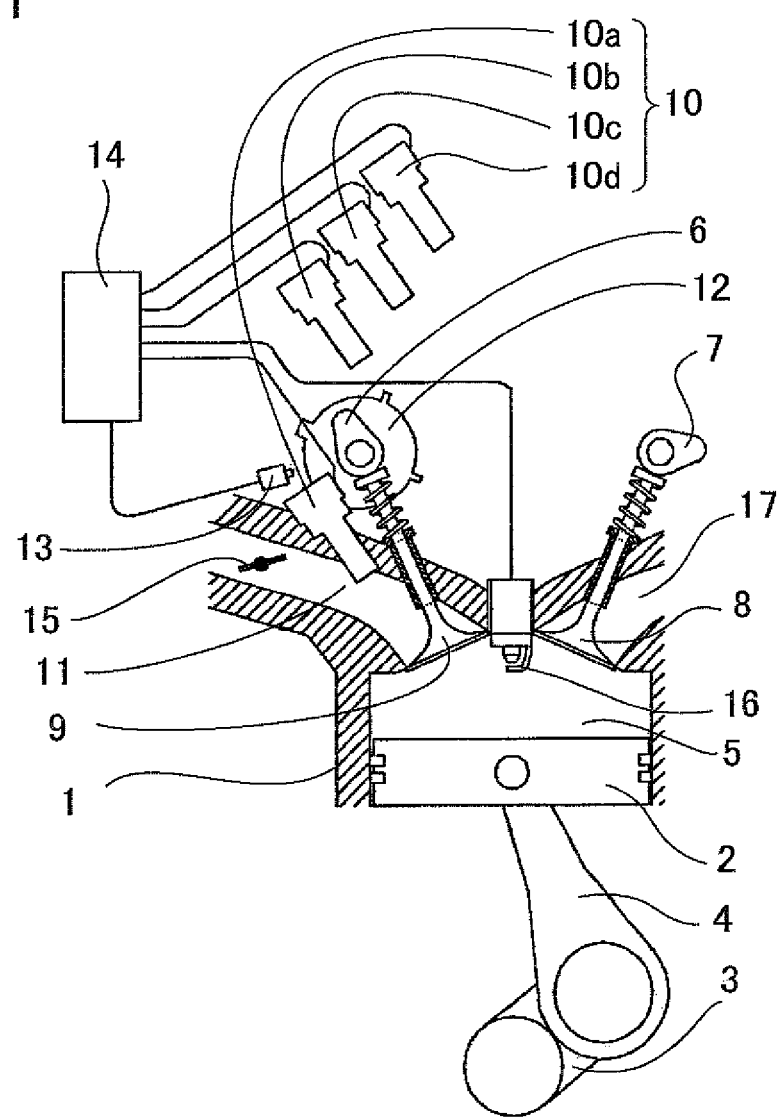
FIG. 1 is a configuration diagram of an internal combustion engine, provided with fuel injection valves for injecting fuel into the respective intake air flow paths of cylinders, that is based on a fuel injection control method according to Embodiment 1 of the present invention.

FIG. 1 is a configuration diagram of an internal combustion engine, provided with fuel injection valves for injecting fuel into the respective intake air flow paths of cylinders, that is based on an internal combustion engine fuel injection control method according to Embodiment 1 of the present invention. As illustrated in FIG. 1, the internal combustion engine according to Embodiment 1 of the present invention includes an internal combustion engine main body 1, a piston 2, a crank 3, a connecting rod 4, a combustion space 5, an intake cum 6, an exhaust cam 7, an exhaust valve 8, an intake valve 9, a fuel injection valve 10, an intake air flow path 11, a cam shaft rotation angle signal plate 12, a cam shaft rotation angle detector 13, an engine controller 14, a throttle valve 15, an ignition plug 16, and an exhaust manifold 17.

At first, with reference to FIG. 1, there will be explained the basic operation of an internal combustion engine utilizing a method of injecting fuel into the intake air flow path of each cylinder. The piston 2 provided in each of the cylinders formed within the internal combustion engine main body 1 reciprocates through the effects of the crank 3 and the connecting rod 4 so as to increase and decrease the capacity of the combustion space 5. A four-stroke-cycle internal combustion engine is configured in such a way that, out of two reciprocal motions of the piston 2 through the effects of the intake cum 6 and the exhaust cam 7, which are set to rotate in twice as long period as the crank 3, in the first stroke where the capacity of the combustion space 5 decreases, the exhaust valve 8 mainly opens, and in the second stroke where the capacity of the combustion space 5 increases, the intake valve 9 mainly opens.

In a gasoline-combustion internal combustion engines, in most cases, before the intake valve 9 starts to open, fuel (unillustrated) is injected from the fuel injection valve 10 provided in each cylinder into the intake air flow path 11. The engine controller 14 calculates the timing of fuel injection, based on information about the cum rotation angle or crank rotation angle that can be detected, for example, by combining the cam shaft rotation angle signal plate 12, which rotates in synchronization with the intake cum 6, with the cam shaft rotation angle detector 13 utilizing a gap sensor or the like, and transmits an injection control signal to the fuel injection valve 10.

When the intake valve 9 is closed, injected fuel remains inside the intake air flow path 11, and part of that adheres to the wall face of the intake air flow path 11 and the surface, at the intake air flow path 11, of the intake valve 9. Then, after the intake valve 9 starts to open, when air, the flow rate of which is adjusted by the throttle valve 15, passes through the intake air flow path 11 to be absorbed by the combustion space 5, the fuel that has remained in the intake air flow path 11 is also absorbed by the combustion space 5.

While being mixed with each other so as to form a homogenous combustible fuel-air mixture (unillustrated), the air and the fuel absorbed by the combustion space 5 are compressed by the piston 2. In the second half of the compression stroke, the ignition plug 16 generates a spark discharge based on a control signal from the engine controller 14 so that the compressed combustible fuel-air mixture (unillustrated) is ignited.

When the combustible fuel-air mixture starts to combust, the pressure in the combustion space 5 increases and hence the piston 2 is pushed back by the pressure energy, whereby shaft rotation power is outputted to the outside of the engine, by the intermediary of the connecting rod 4 and the crank 3.

While the exhaust valve 8 is opened, the combusted combustible fuel-air mixture (unillustrated) is discharged to the outside of the internal combustion engine through the exhaust manifold 17.

Figure 2:
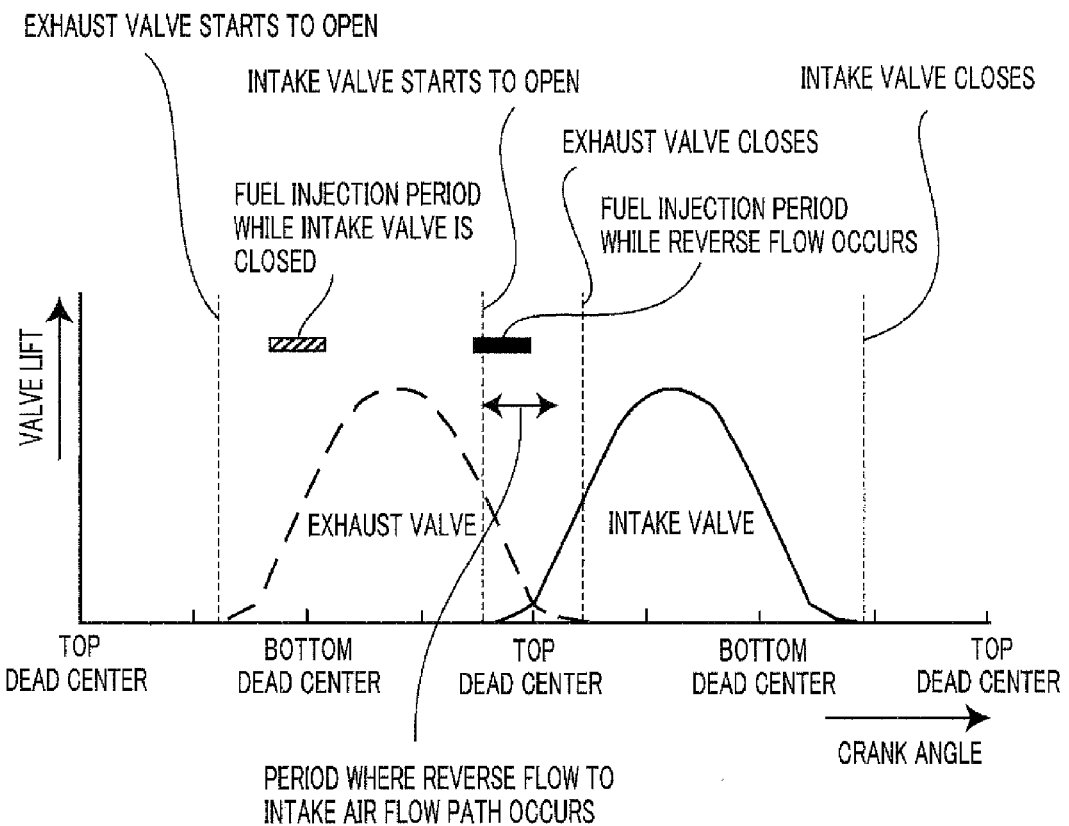
FIG. 2 is a chart for explaining a valve lift pattern and a fuel injection timing according to Embodiment 1 of the present invention.

Next, with reference to FIGS. 2 and 3, there will be explained the operation of fuel absorption by the combustion space 5. FIG. 2 represents examples of the respective valve lift patterns of the exhaust valve 8 and the intake valve 9. In most internal combustion engines, in order to smooth the absorption of air or the like into the combustion space 5, opening of the intake valve 9 is started slightly earlier than the top dead center. On the other hand, in order to exhaust combustion gas smoothly, the exhaust valve 8 is opened slightly delayed with respect to the top dead center. In such a valve operation, there exists a so-called valve overlap timing, in the vicinity of the top dead center, when both the exhaust valve 8 and the intake valve 9 are opened.

Especially in the first half of the valve overlap period, the gas in the combustion space 5 has not been exhausted, and hence the pressure in the combustion space 5 becomes higher than the pressure in the intake air flow path 11; therefore, at the initial time when the intake valve 9 starts to open, there occurs reverse flow, which is a gaseous flow that heads for the intake air flow path from the combustion space 5.

Figure 3:
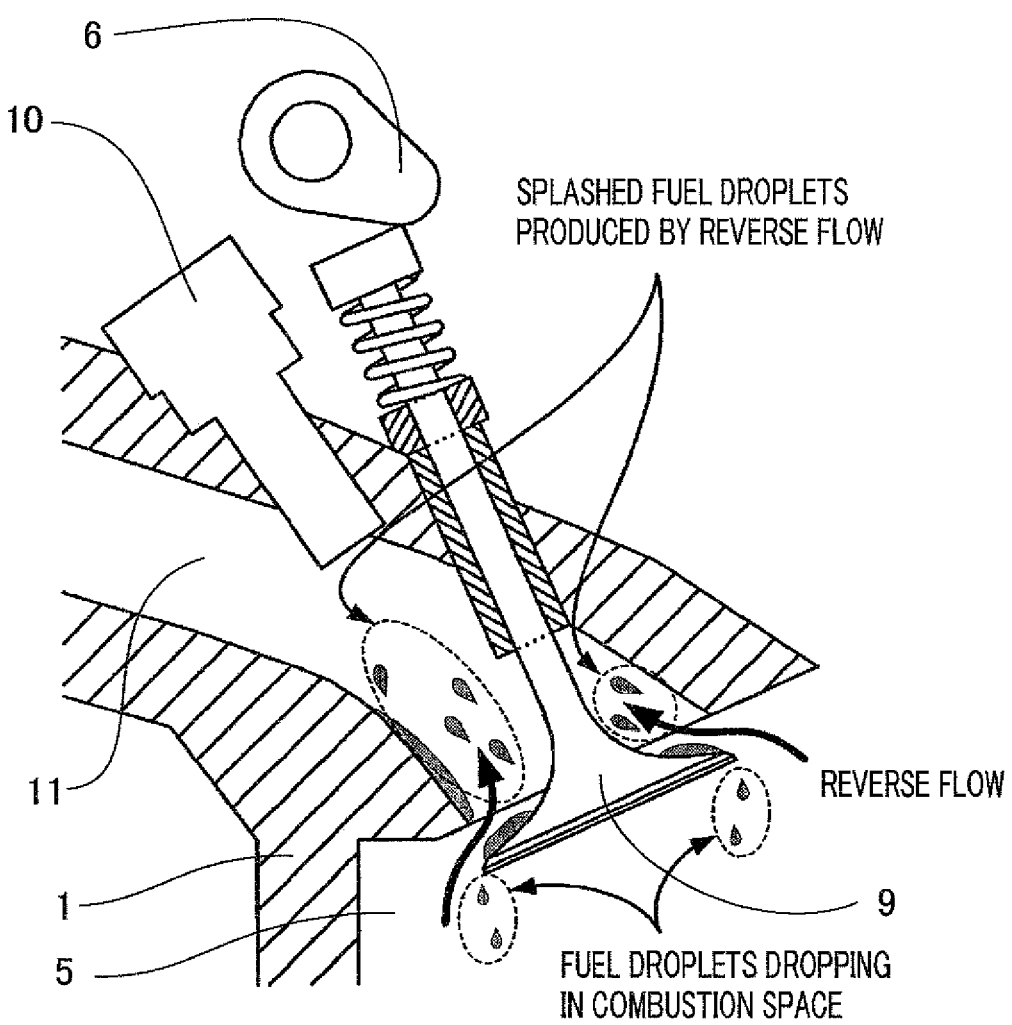
FIG. 3 is a diagram for explaining the behavior of fuel during the reverse flow period.

FIG. 3 illustrates the behavior of fuel during the reverse flow period. Each constituent element is the same as that in FIG. 1; therefore, explanation therefore will be omitted. When the intake valve 9 starts to open, part of the liquid fuel that has adhered to the surface, at the intake air flow path 11, of the intake valve 9 and the wall face of the intake air flow path 11 drips into the inside of the combustion space 5. The dripping fuel adheres to the surface of the piston 2, the inner wall face of the combustion space 5, and the like, thereby hindering formation of a homogenous fuel-air mixture; therefore, there is posed a problem of deterioration in startability, gasoline mileage, and exhaust-gas cleanness.

Another part of the liquid fuel that has adhered to the surface, at the intake air flow path 11, of the intake valve 9 and the wall face of the intake air flow path 11 is drawn into reverse flow to splash reversely in the intake air flow path 11, as fuel particles of a relatively large droplet, and then drawn into an air flow, to the combustion space 5, which is produced immediately after that, to be absorbed by the combustion space 5. Because the fuel particles that splash reversely are directly absorbed by the combustion space 5, as relatively large droplets, the delay of evaporation thereof in the combustion space 5 hinders formation of a homogenous fuel-air mixture; therefore, there is posed a problem of deterioration in startability, gasoline mileage, and exhaust-gas cleanness.

It is clear that there becomes more conspicuous the deterioration, in startability, gasoline mileage, and exhaust-gas cleanness, that is caused by the foregoing behavior, in the case where, when the intake valve 9 starts to open, there exists lots of liquid fuel that adheres to the surface, at the intake air flow path 11, of the intake valve 9 and the wall face of the intake air flow path 11. The present invention relates to a fuel injection control method for reducing the amount of fuel adhesion at the timing when the intake valve 9 starts to open. Next, the basic operation thereof will be explained.

At the timing when the intake valve 9 starts to open, the amount of fuel that has adhered to the surface, at the intake air flow path 11, of the intake valve 9 and the wall face of the intake air flow path 11 differs depending on the amount of fuel injected by the time the intake valve 9 is opened. Because the necessary amount of fuel to be injected in one cycle is determined by the combustion load at that time, it is not made possible to reduce the amount of fuel injection per se for the purpose of decreasing the amount of adhesion; however, by dividing the fuel injection into a plurality of injection instances, there can be reduced the amount of fuel to be injected by the time the intake valve 9 starts to open. Accordingly, in Embodiment 1 of the present invention, as represented in FIG. 2, for example, the first fuel injection is performed while the intake valve 9 is closed, and the second fuel injection is performed in synchronization with a timing when the intake valve 9 is opened and reverse flow is produced.

It is only necessary to perform the first fuel injection while the intake valve 9 is closed, and the number of injection instances is not limited; however, it is required to make the timing of the second fuel injection synchronize with the timing when reverse flow is produced. That is because, by performing injection at the timing when reverse flow is produced, the fuel collides with the gas that has been blown back and hence evaporation is facilitated. That is also because, through collision with fuel droplets that have splashed reversely due to reverse flow, there is obtained an effect that evaporation of not only the fuel per se but also the reverse-flow splashed droplets is facilitated. When, immediately after that, the evaporation-facilitated fuel is absorbed by the combustion space 5, the homogeneousness of a fuel-air mixture formed in the combustion space 5 is raised, whereby there is obtained an effect that the startability, gasoline mileage, and exhaust-gas cleanness are further more improved.

When the timing of the second fuel injection is set to a timing when the intake valve 9 is opened after the reverse flow ends, most of the fuel injected from the fuel injection valve 10 is absorbed by the combustion space 5 without being evaporated; therefore, formation of a homogeneous fuel-air mixture is hindered due to the delay of the evaporation in the combustion space 5, whereby the startability, gasoline mileage, and exhaust-gas cleanness are deteriorated; thus, there is obtained no desired effect.

In addition, in the case where, even though fuel is injected during the reverse flow period, the balance between the injected fuel and fuel that splashes reversely due to reverse flow is not good, both the fuels cannot sufficiently be evaporated; therefore, there is obtained no effect that desired startability, gasoline mileage, and exhaust-gas cleanness are achieved.

Figure 4:
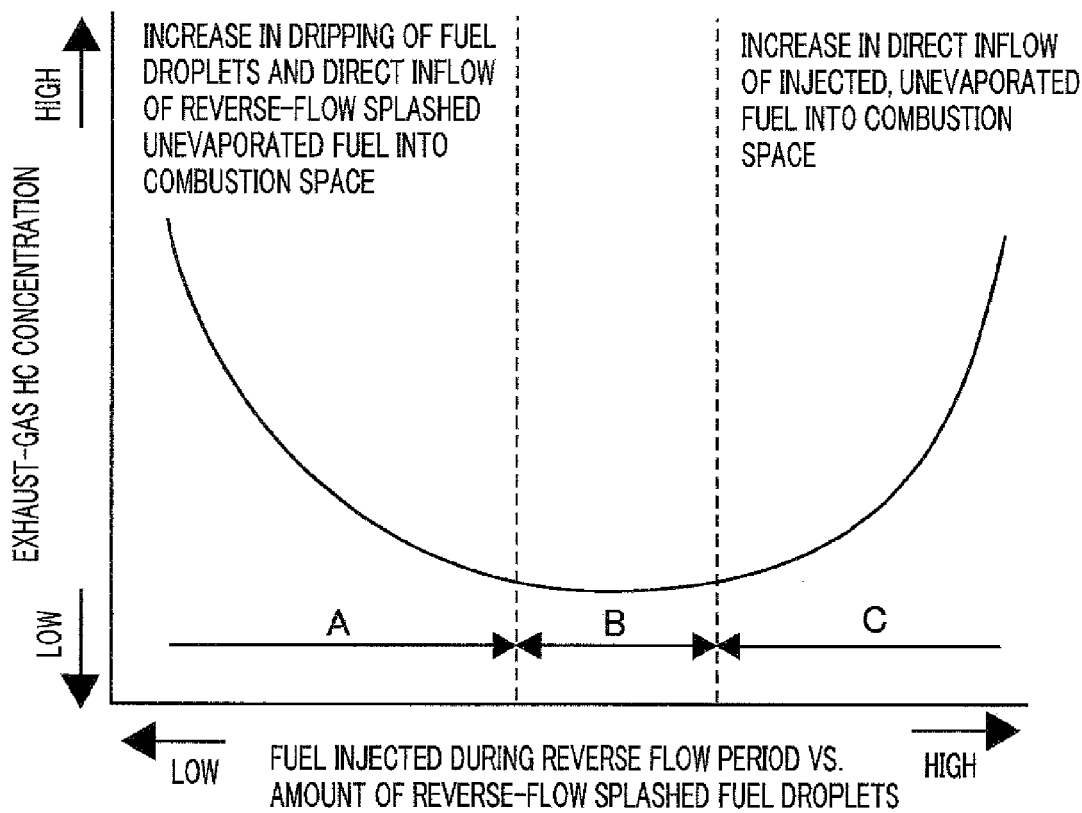
FIG. 4 is a chart representing the relationship between the exhaust-gas HC concentration and the proportion of fuel injected during the reverse flow period to the amount of reverse-flow splashed fuel droplets.

FIG. 4 is a chart representing the relationship between the concentration of hydrocarbon included in exhaust gas and the proportion of fuel injected during the reverse flow period to the amount of reverse-flow splashed fuel droplets; in the case where the proportion is small, as indicated by A, there is represented the fact that, because fuel droplets directly drip into the combustion space 5 and reverse-flow splashed fuel droplets flow into the combustion space 5 without being evaporated, the concentration of hydrocarbon rises; in the case where the proportion is large, as indicated by C, there is represented the fact that, because part of fuel injected during the reverse flow period flows into the combustion space 5 without being evaporated, the concentration of hydrocarbon rises. Accordingly, in order to prevent the concentration of hydrocarbon from rising, i.e., to obtain a good combustion state where the startability, gasoline mileage, and exhaust-gas cleanness are raised, it is required to perform fuel injection control for keeping the proportion always falling within the range B.

In this regard, however, the amount of fuel droplets that splash reversely due to reverse flow differs depending on the temperatures of the surface, at the intake air flow path 11, of the intake valve 9 and the wall face of the intake air flow path 11 onto which injected fuel adheres. In other words, even though the same amount of fuel is injected by the time the intake valve 9 is opened, evaporation is sluggish when the engine is started at a low temperature; therefore, most of the fuel splashes reversely, and as the engine warms up, the evaporation becomes active, whereby the amount of reverse-flow splashed fuel is reduced.

As described above, in order to keep the balance between the fuel injected during the reverse flow period and the fuel that splashes reversely due to reverse flow, there is required fuel injection control for changing the proportion of the amount of fuel injected while the intake valve 9 is closed to the amount of fuel injected during the reverse flow period, by estimating the temperatures of the surface, at the intake air flow path 11, of the intake valve 9 and the wall face of the intake air flow path 11 onto which the fuel, injected while the intake valve 9 is closed, once adheres.

Next, with reference to the flowchart in FIG. 5, there will be explained a specific method for the fuel injection control for changing the proportion of the amount of fuel injected while the intake valve 9 is closed to the amount of fuel injected during the reverse flow period, based on the coolant temperature and the exhaust-gas temperature.

For example, when the engine key is turned and combustion control for the internal combustion engine is started, it is required to calculate the proportion of fuel to be injected during the reverse flow period before fuel is injected for the first time after the start of the engine. Even in the case where the internal combustion engine is in the stop mode, the coolant temperature is approximately proportional to the temperatures of the surface, at the intake air flow path 11, of the intake valve 9 and the wall face of the intake air flow path 11; therefore, the calculation, based on the coolant temperature, of the proportion of fuel to be injected becomes possible already from a time immediately after the internal combustion engine starts.

The calculation, based on the coolant temperature, of the proportion of fuel to be injected can be performed during combustion operation after the start of the internal combustion engine; however, in general, the heat capacity of coolant water is large; thus, after the internal combustion engine starts to operate, the temperatures of the surface, at the intake air flow path 11, of the intake valve 9 and the wall face of the intake air flow path 11 change faster than the coolant temperature. Accordingly, it is difficult to correctly calculate the proportion of fuel to be injected while the temperature of the surface, at the intake air flow path 11, of the intake valve 9 and the wall face of the intake air flow path 11 change.

In contrast, the exhaust-gas temperature is not proportional to the temperatures of the surface, at the intake air flow path 11, of the intake valve 9 and the wall face of the intake air flow path 11 while the internal combustion engine is in the stop mode; therefore, the calculation of the proportion of fuel to be injected cannot be performed at a time instant immediately after the start of the engine. However, after the start of the combustion, the exhaust-gas temperature is approximately proportional to the temperature of the intake valve 9 and the like; therefore, it is made possible to relatively correctly calculate the proportion of fuel to be injected while the temperature of the surface, at the intake air flow path 11, of the intake valve 9 and the wall face of the intake air flow path 11 change.

Thus, in the step S100, there is performed switching processing in which, for several cycles immediately after the start of the internal combustion engine, coolant-temperature-based calculation of the proportion of fuel to be injected during the reverse flow period is performed in the step S101, and after that, exhaust-gas-temperature-based calculation of the proportion of fuel to be injected during the reverse flow period is performed in the step S102.

Figure 6:
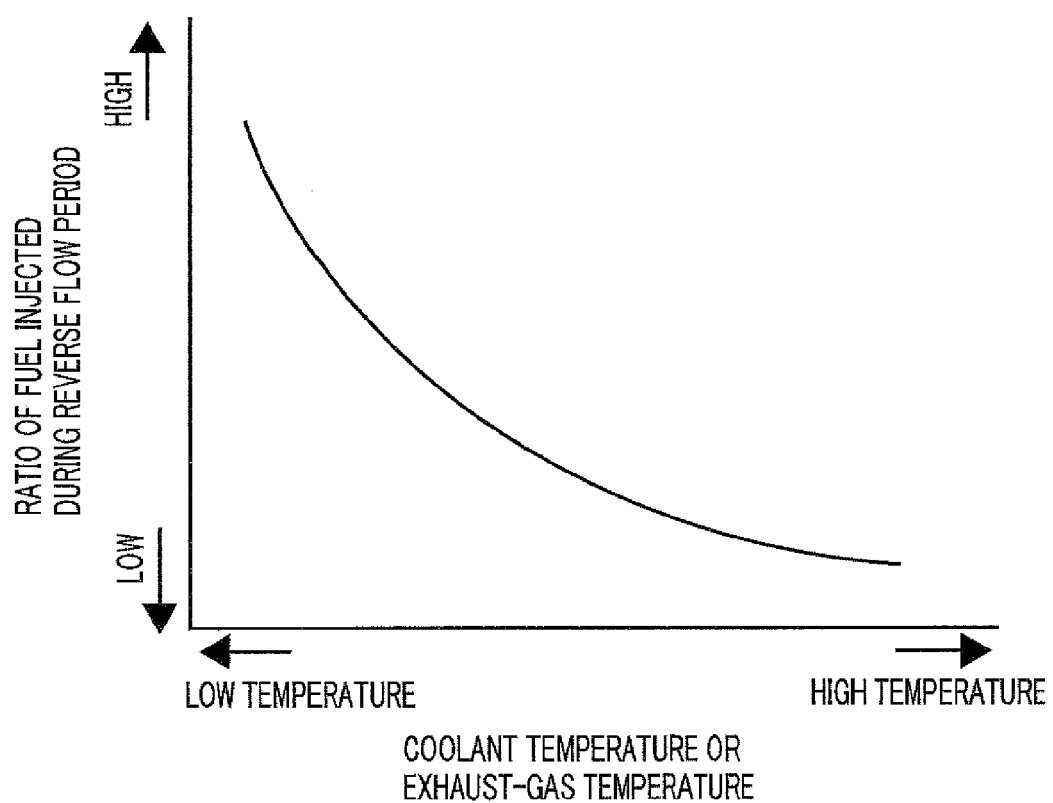
FIG. 6 is a chart representing an example of setting in the case where the proportion of fuel to be injected during the reverse flow period is set based on the coolant temperature or the exhaust-gas temperature, according to Embodiment 1 of the present invention.

In the steps S101 and S102, for example, a multi-degree function as represented in FIG. 6, a linear function, a data base, or the like, related to temperature, with which the proportion of fuel becomes larger as the coolant temperature or the exhaust-gas temperature becomes lower are preliminarily stored in a control program, and then a measured temperature is substituted for the function or referred to, so that the proportion for each cycle is obtained. The function or data base can readily be obtained by acquiring through an experiment the proportion with which the gasoline mileage and the exhaust-gas cleanness is best under a plurality of temperatures.

Next, in the step S103, based on the ratio, of the amount of fuel injected during the reverse flow period, that is calculated in the step S103 or S102, there is set the length of each of fuel injection control signals for one-cycle injection. Specifically, the total one-cycle length, of the fuel injection control signal, that is necessary for obtaining the air-fuel ratio of the fuel-air mixture, as a control target, is divided in proportion to each injection.

The fuel injection valve is opened or closed based on the fuel injection control signal; it operates slightly delayed with respect to the control signal. Especially, in the case of a fuel injection valve according to an electromagnetic-coil driving method, the valve opening operation is delayed by approximately 0.5 milliseconds; thus, even though the fuel injection control signal, shorter than the foregoing delay time, is given, fuel cannot be injected. Accordingly, in the step S104, it is determined whether or not there exists a condition that any one of the lengths of the divided control signals is shorter than the minimum length; in the case where there exists that condition, the proportion of fuel injection for which the length of the control signal is shorter than the minimum length is set to zero and the divisions for the rest injections are recalculated in the step S105.

Now that the length of the injection control signal for each injection has been fixed, the injection control signal for each injection is outputted at its own timing in the step S106.

After every fuel injection is completed, the ignition control signal is outputted at a predetermined timing in order to start combustion in the step S107; in the case where the combustion control is performed also in the following cycle, the step S100 is resumed, based on the determination in the step S108, for example, by determining with reference to a flag value, in the memory, that indicates that the combustion operation is being carried out continuously.

As described above, in the internal combustion engine fuel injection control method according to Embodiment 1 of the present invention, there is performed fuel injection control in which, based on the coolant temperature, the proportion of the amount of fuel injected while the intake valve 9 is closed to the amount of fuel injected during the reverse flow period is calculated; therefore, evaporation of the fuel and mixture of the fuel and air are facilitated already from a time immediately after the start of the internal combustion engine. As a result, there can always be obtained an effect that startability, gasoline mileage, and exhaust-gas cleanness are improved.

Moreover, there is performed fuel injection control in which, based on the exhaust-gas temperature, the proportion of the amount of fuel injected while the intake valve 9 is closed to the amount of fuel injected during the reverse flow period is calculated; therefore, appropriate evaporation and mixture of the fuel and air are facilitated even in the process that, after the combustion in the internal combustion engine starts, the temperatures of the surface, at the intake air flow path 11, of the intake valve 9 and the wall face of the intake air flow path 11 change. As a result, there can be obtained a good effect that startability, gasoline mileage, and exhaust-gas cleanness are improved.

Embodiment 2

In Embodiment 1 described above, there has been explained controlling operation in which, based on the coolant temperature and the exhaust-gas temperature, the proportion of the amount of fuel injected while the intake valve 9 is closed to the amount of fuel injected during the reverse flow period is calculated; however, Embodiment 2 of the present invention is to provide a specific method for fuel injection control in which the proportion of the amount of fuel injected while the intake valve 9 is closed to the amount of fuel injected during reverse flow period is changed, based on the running time of engine operation and the cycle numbers of engine operation, instead of the exhaust-gas temperature. The method will be explained below with reference to FIGS. 7 and 8.

Figure 7:
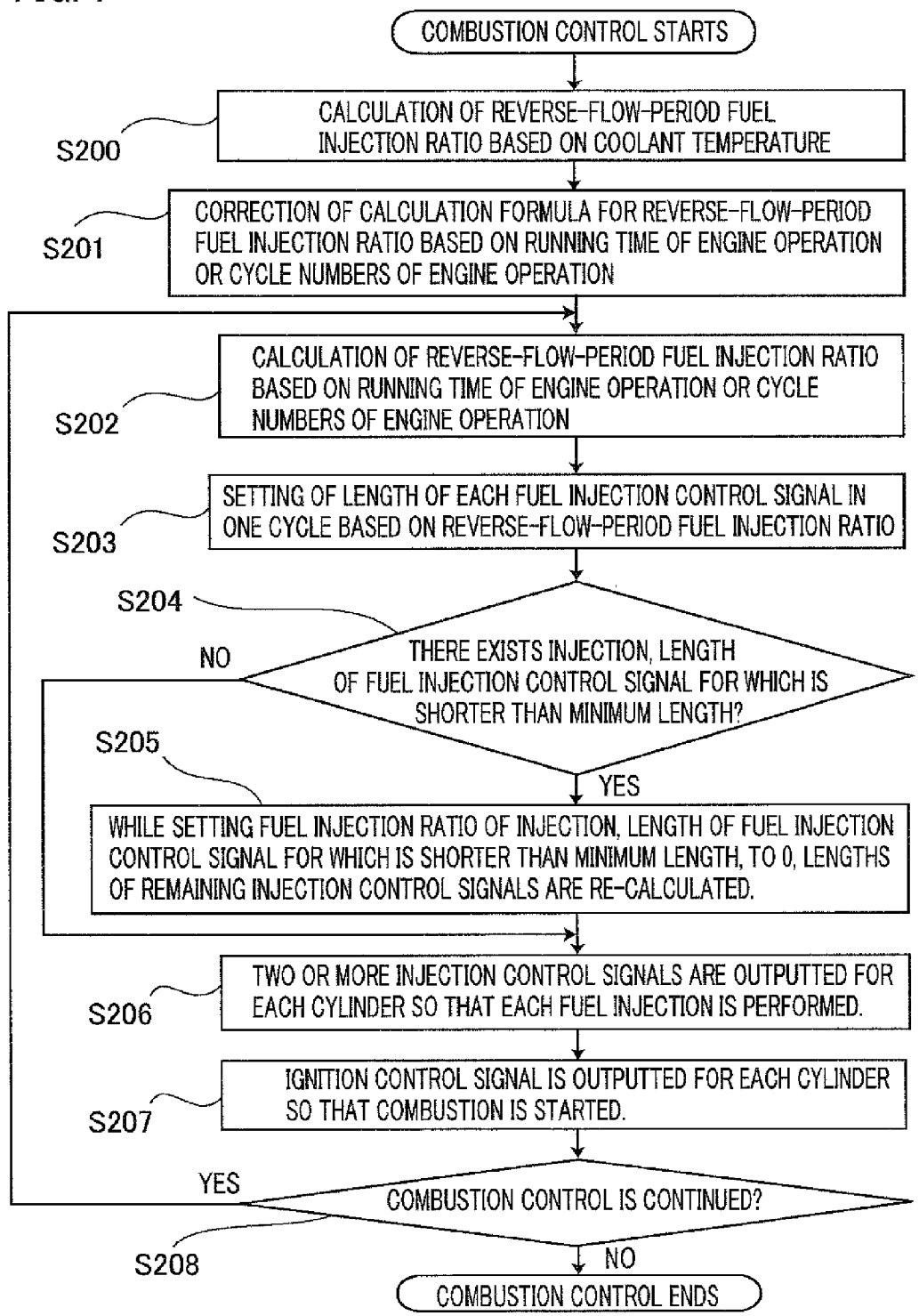
FIG. 7 is a flowchart representing the setting of fuel injection control based on the coolant temperature and the running time of engine operation or the cycle numbers of engine operation and the procedure of combustion control according to Embodiment 2 of the present invention.

FIG. 7 is a flowchart, of Embodiment 2, representing the setting of fuel injection control based on the coolant temperature and the running time of engine operation or the cycle numbers of engine operation and the procedure of combustion control. In FIG. 7, for example, when the engine key is turned and combustion control for the internal combustion engine is started, there is calculated, in the step S200, the proportion of fuel to be injected during the reverse flow period before fuel is injected for the first time after the start of the engine. The calculation method is the same as that in Embodiment 1; for example, a multi-degree function as represented in FIG. 6, a linear function, a data base, or the like, related to temperature, with which the proportion of fuel becomes larger as the coolant temperature or the exhaust-gas temperature becomes lower are preliminarily stored in a control program, and then a measured temperature is substituted for the function or referred to, so that the proportion is obtained.

Figure 8:
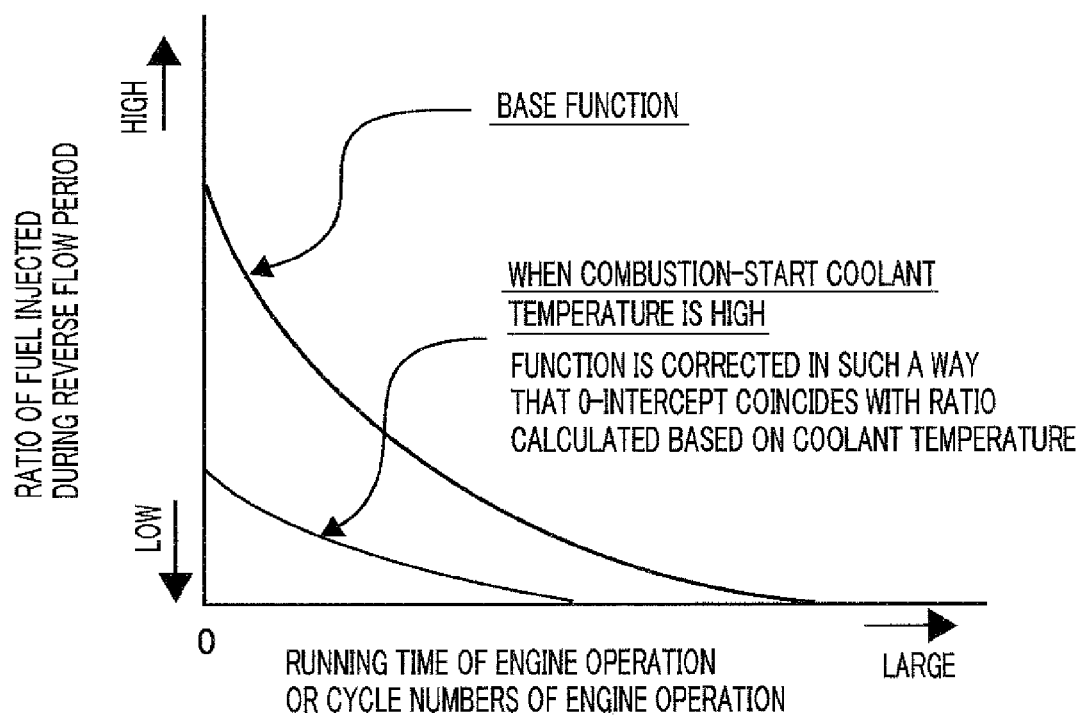
FIG. 8 is a chart representing an example of setting in the case where the proportion of fuel to be injected during the reverse flow period is set based on the running time of engine operation or the cycle numbers of engine operation, according to Embodiment 2 of the present invention.

The injection proportion for the following cycle and thereafter is obtained in the step S202, based on the running time of engine operation or the cycle numbers of engine operation. In this case, as well, there will preliminarily be obtained a base function as represented in FIG. 8. When the engine is started, the temperatures of the surface, at the intake air flow path 11, of the intake valve 9 and the wall face of the intake air flow path 11 rise gradually; therefore, the base function has a characteristic that, as represented in FIG. 8, the shorter the running time of engine operation is or the smaller the cycle numbers of engine operation is, the larger the proportion of fuel injected during the reverse flow period becomes.

In the actual fuel injection control, it is required to obtain the proportion of fuel injected during the reverse flow period by gradually reducing the injection proportion that has been calculated, in the step S200, at the beginning of combustion operation, in accordance with the running time of engine operation or the cycle numbers of engine operation. Accordingly, in the step S201, by being shifted along the abscissa, the base function represented in FIG. 8 is corrected so that the value thereof at the 0-intercept in the abscissa coincides with the proportion that has been calculated in the step S200.

In the step S202, the running time of engine operation or the cycle numbers of engine operation is substituted for the function that has been shifted along the abscissa in the step S201, so that there is calculated the proportion of fuel injected during the reverse flow period for each cycle.

Figure 5:
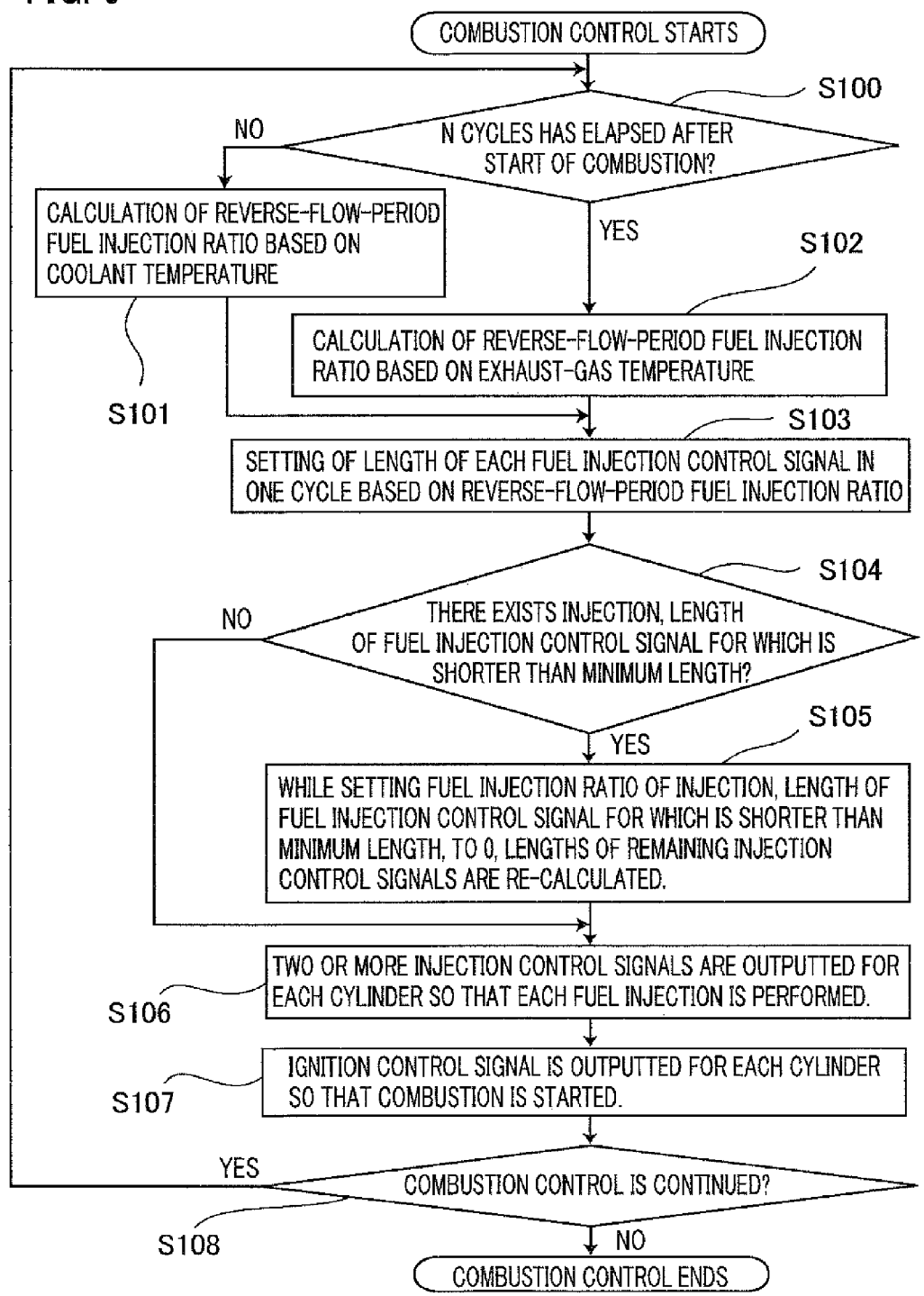
FIG. 5 is a flowchart representing the setting of fuel injection control based on the coolant temperature and the exhaust-gas temperature and the procedure of combustion control according to Embodiment 1 of the present invention.

The flow of control in the step S203 through the step S207 is the same as the flow of control, in the step S103 through the step S107 in FIG. 5, that has been explained in Embodiment 1; therefore, explanation therefor will be omitted.

In the case where the combustion control is continued in the following cycle, the step S202 is resumed based on the determination in the step S202.

As described above, in the internal combustion engine fuel injection control method according to Embodiment 2 of the present invention, there is performed fuel injection control in which, by use of a means that does not detect the exhaust-gas temperature, there is calculated the proportion of the amount of fuel injected while the intake valve 9 is closed to the amount of fuel injected during the reverse flow period; therefore, without adding measurement of the state of the internal combustion engine, the mixture of the fuel and air is facilitated with an inexpensive and simple system configuration, already from a time immediately after the start of the internal combustion engine. As a result, there can always be obtained an effect that startability, gasoline mileage, and exhaust-gas cleanness are improved.

Moreover, the function for obtaining the proportion of fuel to be injected is corrected in accordance with the proportion of fuel that has been obtained at the beginning of the combustion operation; thus, a more appropriate proportion of fuel to be injected can be set.

In addition, with regard to the timing of injection during the reverse flow period, it is only necessary that the greater part of the period during which fuel is substantially injected coincides with the reverse flow period; thus, even though part of the period during which fuel is substantially injected does not fall within the reverse flow period, an appropriate effect can be demonstrated.

Various modifications and alterations of this invention will be apparent to those skilled in the art without departing from the scope and spirit of this invention, and it should be understood that this is not limited to the illustrative embodiments set forth herein.

What is claimed is:

1. An internal combustion engine fuel injection control method wherein, in an internal combustion engine provided with a fuel injection valve for injecting fuel into an intake air flow path for each cylinder, there is performed a plurality of fuel injections during one cycle for each cylinder, one of the said injections thereof being performed in synchronization with a period during which an intake valve starts to open and reverse flow of in-cylinder gas into the intake air flow path occurs.

2. The internal combustion engine fuel injection control method according to claim 1, wherein, in accordance with a measurement quantity that changes as the temperatures of the surface, at the intake air flow path, of the intake valve and the inner wall face of the intake air flow path change, there is set the proportion of the amount of fuel injected in synchronization with the period during which reverse flow of in-cylinder gas into the intake air flow path occurs to the total amount of fuel injected in one cycle for each cylinder.

3. The internal combustion engine fuel injection control method according to claim 1, wherein, there is preliminarily created a function or a data base with which the lower is the coolant temperature of the internal combustion engine, the larger is the proportion of the amount of fuel injected in synchronization with the period during which reverse flow of in-cylinder gas into the intake air flow path occurs to the total amount of fuel injected in one cycle for each cylinder; and the coolant temperature is substituted for the function or the data base is referred to with regard to the coolant temperature so that there is set the proportion of the amount of fuel injected in synchronization with the period during which reverse flow of in-cylinder gas into the intake air flow path occurs.

4. The internal combustion engine fuel injection control method according to claim 1, wherein, there is preliminarily created a function or a data base with which the lower is the exhaust-gas temperature of the internal combustion engine, the larger is the proportion of the amount of fuel injected in synchronization with the period during which reverse flow of in-cylinder gas into the intake air flow path occurs to the total amount of fuel injected in one cycle for each cylinder; and the exhaust-gas temperature is substituted for the function or the data base is referred to with regard to the exhaust-gas temperature so that there is set the proportion of the amount of fuel injected in synchronization with the period during which reverse flow of in-cylinder gas into the intake air flow path occurs.

5. The internal combustion engine fuel injection control method according to claim 1, wherein, there is preliminarily created a base function with which the shorter is the running time of engine operation of the internal combustion engine or the smaller is the cycle numbers of engine operation, the larger is the proportion of the amount of fuel injected in synchronization with the period during which reverse flow of in-cylinder gas into the intake air flow path occurs to the total amount of fuel injected in one cycle for each cylinder; the base function is corrected in accordance with the proportion, of the amount of fuel injected in synchronization with the period during which reverse flow of in-cylinder gas into the intake air flow path occurs, that is obtained based on the coolant temperature at the beginning of combustion operation; and the running time of engine operation or the cycle numbers of engine operation is substituted for a function obtained by correcting the base function so that there is set the proportion of the amount of fuel injected in synchronization with the period during which reverse flow of in-cylinder gas into the intake air flow path occurs.

* * * * *